(12) United States Patent
Thorner

(10) Patent No.: US 6,232,932 B1
(45) Date of Patent: May 15, 2001

(54) APPARATUS AND METHOD FOR PROVIDING MODULAR RECONFIGURABLE MULTI-FUNCTION DISPLAYS FOR COMPUTER SIMULATIONS

(76) Inventor: Craig A. Thorner, 16 Nantucket Ct., Howell, NJ (US) 07731

(*) Notice: Subject to any disclaimer, the term of this patent is extended or adjusted under 35 U.S.C. 154(b) by 0 days.

(21) Appl. No.: 09/116,359

(22) Filed: Jul. 16, 1998

(51) Int. Cl.[7] .................................................. G09G 5/00
(52) U.S. Cl. ................................. 345/1; 348/121; 434/69
(58) Field of Search ..................................... 345/1–3, 903,
345/112, 115, 502; 340/717; 434/29, 37,
69; 348/121, 123

(56) References Cited

U.S. PATENT DOCUMENTS

| | | |
|---|---|---|
| 4,965,559 | 10/1990 | Motorola, Inc. . |
| 5,105,183 * | 4/1992 | Beckman ........................... 340/717 |
| 5,184,956 * | 2/1993 | Langlais et al. ....................... 434/69 |
| 5,240,419 * | 8/1993 | DeGyarfas ........................... 434/322 |
| 5,274,363 * | 12/1993 | Koved et al. ............................ 345/2 |
| 5,275,565 * | 1/1994 | Moncrief ............................... 434/29 |
| 5,361,078 * | 11/1994 | Caine ...................................... 345/1 |
| 5,381,347 | 1/1995 | Microsoft Corp. . |
| 5,428,395 | 6/1995 | Samsung Elecronics Co., LTD. . |
| 5,459,477 * | 10/1995 | Fukuda et al. .......................... 345/1 |
| 5,802,318 * | 9/1998 | Murray et al. ....................... 395/280 |
| 5,956,046 * | 9/1999 | Kehlet et al. ........................ 345/502 |
| 6,046,709 * | 4/2000 | Shelton et al. ........................... 345/1 |

\* cited by examiner

Primary Examiner—Amare Mengistu
Assistant Examiner—Jimmy H. Nguyen
(74) Attorney, Agent, or Firm—Craig Thorner

(57) ABSTRACT

A modular and reconfigurable Multi-Function Display (MFD) system allows a computer system to drive one or more Multi-Function Displays that display information independently of other display screens driven by a computer simulation. Video channels generated by a computer simulation are carried in parallel to one or more MFD modules. A channel selector on each MFD determines which single video channel is to be displayed on that MFD. Each MFD consists of a relatively small and flat color display screen that displays images supplied by the computer simulation. Each MFD provides a plurality of user input devices that are connected to the computer host via a digital I/O bus. The MFDs are modular such that a first MFD is attached directly to the computer system, and an optional second MFD is attached to the first, and a third optional MFD is attached to the second, and so on, thereby providing every MFD thus attached a parallel connection to the digital I/O bus of the computer simulation system and to the available video channels.

18 Claims, 9 Drawing Sheets

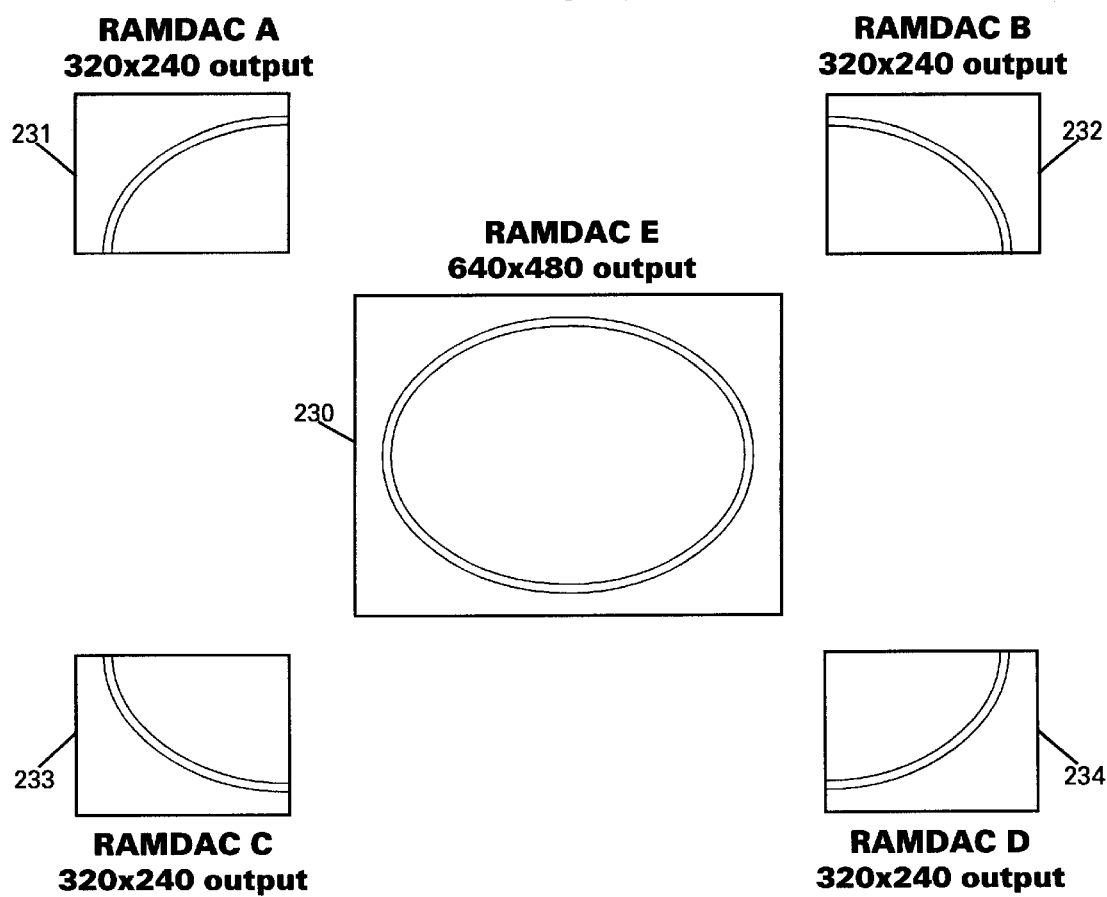

300

300

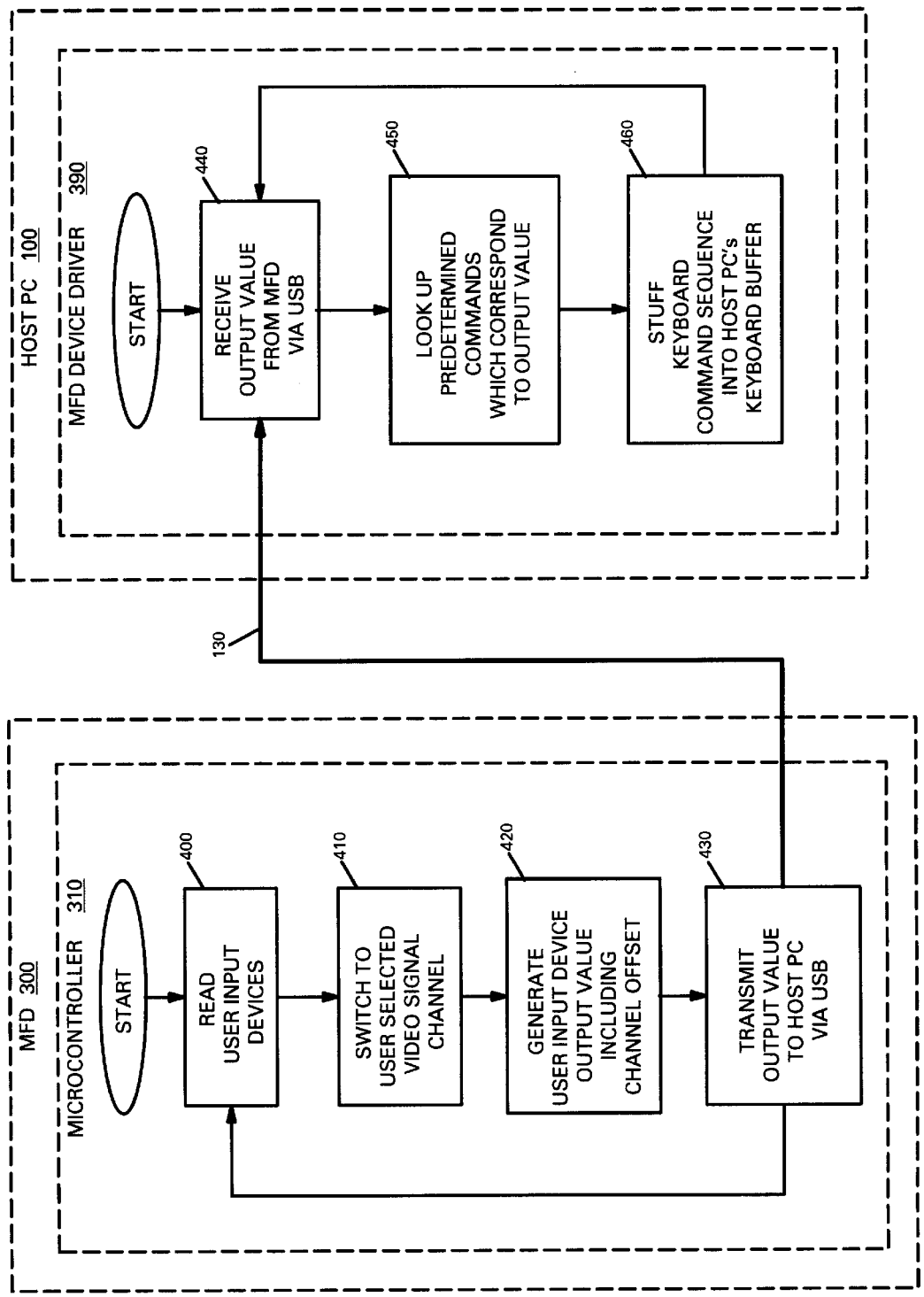

APPARATUS AND METHOD FOR PROVIDING MODULAR RECONFIGURABLE MULTI-FUNCTION DISPLAYS FOR COMPUTER SIMULATIONS

BACKGROUND OF THE INVENTION

1. Field of the Invention

The present invention relates generally to computer simulation systems, and, more specifically, to a means of enhancing a computer simulation with one or more Multi-Function Displays.

2. Description of the Prior Art

Multi-Function Displays (MFDs) are, among other things, a state of the art means for providing information to fighter pilots during flight operations. Generally, a Multi-Function Display is a relatively small screen that can display a multitude of images. MFDs are typically surrounded by a plurality of user input devices (buttons, switches, dials, etc.) that can reconfigure the information on the display. Most modern aircraft have several MFDs, each of which can be configured to display information independently of the other MFDs. When multiple MFDs are simultaneously displaying a wide range of information, the situational awareness of the pilot is greatly enhanced. Therefore, MFDs are an excellent means for facilitating successful flight operations.

Modern computer systems are becoming very powerful, and are capable of rendering complex flight simulations that are faithful to the real aircraft that are being simulated. Readily available consumer PCs are becoming increasingly able to render high-fidelity simulations that include 3D accelerated graphics, digital audio, networked communications and multi-player capability, artificial intelligence, and physical feedback devices.

As computer based simulations have become higher in complexity and fidelity, the MFDs that are actually present in the real aircraft that are being simulated by the computer are typically provided for the simulation user as "virtual MFDs". These virtual MFDs are typically displayed on the main monitor of the computer system, where they take up valuable space on the screen on which they are being displayed. It is typical for a simulation to offer many display modes in order to compensate for this inefficient but necessary use of screen space in displaying MFDs. One screen mode may display a front cockpit view with a few MFDs at the bottom of the screen (simulating the view one might have if sitting in the real aircraft and looking forward in the cockpit), while another may display a front cockpit view with the cockpit and fuselage transparently rendered (thereby providing a fictional, but totally unobstructed front view of the outside world, with no instrumentation or MFDs visible), while another may display a full screen, cockpit only view (with no portion of the outside world visible, wherein multiple MFDs fill the screen, but are relatively low in resolution), while another may show a full screen, high resolution, single MFD view (which obstructs the rest of the simulated world).

The information provided by these virtual MFDs is often indispensable, and therefore, the view on the main display must be changed constantly as the situation requires in order to maintain situational awareness. Many modern simulations have as many as a dozen or more independent views, with each showing some rendered subset of the complete simulated world. An inherent problem is that while any given selected view is present on the simulation user's viewscreen, information present in other views can not be seen simultaneously. This creates a problem of poor continuity between view modes. Although the many available views are accessible only at the expense of continuity, they are necessary to provide a thorough view of the aircraft, its cockpit, and the outside world. While these display modes tend to alleviate the limited field of view on typical display monitors, handling all of these fractional views becomes a confusing task that increases the workload of the simulation pilot. Furthermore, the command keypresses necessary to accommodate the switching of these view screen modes are arbitrary and inconsistent from one flight simulation to the next. In short, multiple screen modes are a necessary (but very confusing) element of modern computer simulations, because the display area of a single screen simply can not simultaneously show all of the information necessary in order to achieve a high-fidelity simulation of the real world.

Multiple monitor solutions are now possible, wherein a single computer (or network of computers) can drive multiple display screens. In this way, a front view may be rendered on a first screen, while instruments and/or MFDs may be rendered on a second screen, while right, left, and rear views may be rendered on third, fourth, and fifth screens, and so on. This approach, while effective, is computationally expensive, as each physical display requires more and more computing power to illustrate a complex scene simultaneously with the other screens. Furthermore, each screen requires its own video card, and most computers have a limited number of expansion slots with which to accommodate them. In addition, assuming one or more virtual MFDs were displayed on a screen other than main view screen, the simulation pilot would have to look away from the main view, observe the desired virtual MFD on a second screen (likely adjacent to the first), and, upon desiring to see a different view on that same MFD, would have to look back at the keyboard and press an arbitrary mode select key to change the view on the given MFD, and then look back at the given MFD to see the results of that keypress. This is a very inefficient procedure. Some simulations provide "virtual cockpits" which provide polygonal, texture mapped cockpits that can be smoothly rotated around by the simulation pilot, wherein the virtual buttons on the virtual MFDs in the virtual cockpit are active "point and click" devices, where the user can press any given virtual MFD button by clicking on it with a pointing device of some kind. In these "point and click" virtual cockpits, one pointing device services all of the MFDs in the virtual cockpit. In order to actuate any given MFD button, the user has to visually locate the pointer, bring it across the screen area that is situated between the pointer's current location and the desired virtual button on the appropriate virtual MFD, a then "click" the pointing device to actuate the virtual MFD button. This eliminates some confusion by eliminating arbitrary keyboard keypresses, but introduces additional deviation from reality by forcing the user to interact with the virtual MFDs with a pointing icon that floats within the currently selected cockpit view.

The intended benefits of real MFDs are situational awareness and operational efficiency. When a simulation user interacts with the virtual MFDs described above, these benefits are inherently compromised.

OBJECTS AND SUMMARY OF THE INVENTION

The aforementioned problems are alleviated by the present invention which provides a modular and reconfigurable Multi-Function Display (MFD) solution for computer simulations.

It is an object of the present invention to provide relatively small and flat (e.g., five inch diagonal measure TFT LCD)

display screens that can display images generated by a computer simulation.

It is a further object of the present invention to allow a shared block of video RAM on a single interface card to generate multiple independent video signal output channels for display on the aforementioned display screens, where the video signal carried on any given video output channel is derived from its own designated subset of the shared video RAM.

It is a further object of the present invention to provide a video signal connection system such that all of the independent video signal output channels are carried independently via single channel video cables to one or more MFDs, where each MFD receives a single video channel.

It is a further object of the present invention to provide a video signal connection system such that all of the independent video signal output channels are carried in parallel via a multi-channel cable to one or more MFDs, where each MFD receives all of the channels but displays a single user selected channel at a time via a channel selection means on each display.

It is a further object of the present invention for each MFD to be able to be oriented in a portrait or landscape fashion, depending upon the requirements of the displayed images, where a switch within each MFD senses the orientation of that screen, and transmits that information to an MFD device driver.

It is also an object of the present invention to provide user input devices (switches, buttons, dials, etc.) around the periphery of those provided screens, where actuating any given user input devices causes the images displayed on that MFD's display screen to be altered, and/or transmits predetermined, video channel specific codes to the computer simulation system over a digital I/O bus to be handled by an MFD device driver.

It is a further object of the present invention to provide an external software application that can create, save, and load user input device code sets, which are used by an MFD device driver on the computer simulation system, to provide a simple means for reprogramming the functions of the user input devices.

It is a further object of the present invention to link the codes for the user input devices on each MFD to a given video display channel, such that selecting any given video signal channel on any given display also selects that corresponding user input device code set for that selected channel.

It is a further object of the present invention to provide a means whereby one or more substantially identical MFD modules can be attached, in parallel, to the same I/O bus, in a daisy-chain fashion, such that each MFD is one component of a modular system.

It is a further object of the present invention to provide a means whereby one or more substantially identical MFD modules can be attached, in parallel, to the same multi-channel video cable, in a daisy-chain fashion, such that each MFD is one component of a modular system.

It is a further object of the present invention to provide a means by which the provided user input devices can emulate any desired keypresses on a keyboard or some specific manipulation of a given input device, while having the capability to peacefully coexist with that keyboard or given input device independently or in parallel.

The above and other objects, features, and advantages of the present invention will become apparent from the following detailed description of a preferred embodiment taken in conjunction with the accompanying drawings, throughout which like reference numerals designate like elements and parts.

BRIEF DESCRIPTION OF THE DRAWINGS

FIG. 3 is an illustration of the video RAM partitioning technique of a preferred embodiment of the present invention, wherein a single video image yields four independent video images.

FIG. 8A is a flow chart of the process of how digital command codes associated with the user input devices on a Multi-Function Display are generated for the computer simulation system.

FIG. 8B is a flow chart of the process of how digital command codes associated with the user input devices on a Multi-Function Display are interpreted by the computer simulation system via a device driver.

DETAILED DESCRIPTION OF THE INVENTION

Figure 1A:
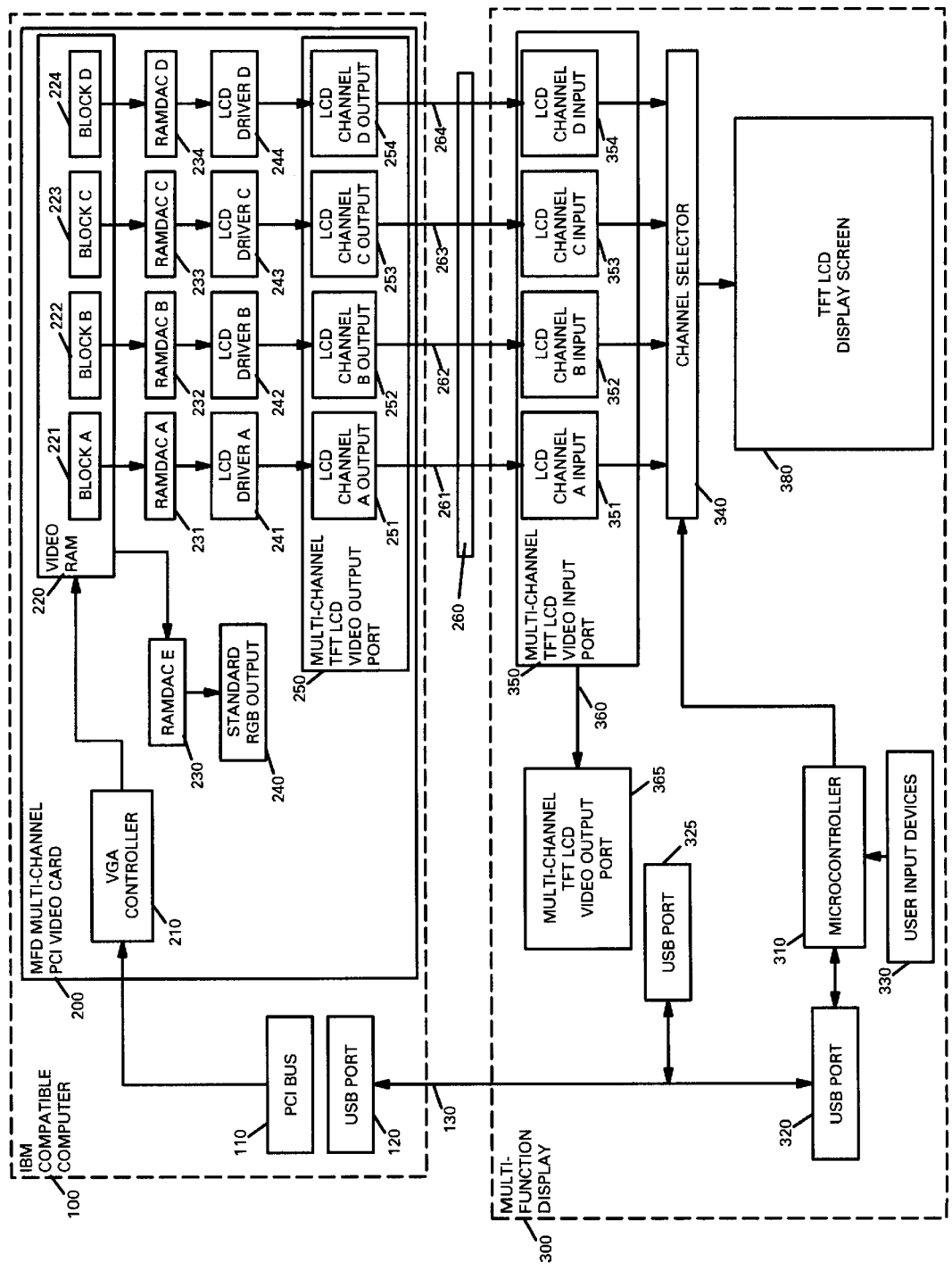
FIG. 1A is a functional block diagram illustrating a preferred embodiment of the present invention, where four video channels are transmitted to each single MFD, and a single video channel is selected for display by a channel selector.

FIG. 1A is a functional block diagram illustrating a preferred embodiment of the present invention. For the purposes of the preferred embodiment described herein, the computer simulation system is based upon an IBM compatible computer 100 (hereafter referred to as the host PC 100) with an available PCI (Peripheral Component Interconnect) bus expansion slot 110 and a USB (Universal Serial Bus) port 120. The PCI slot is an industry standard means for expansion cards such as the MFD Multi-Channel PCI Video Card 200 (hereafter referred to as the MFD Video Card 200) to access the digital bus of the host PC 100. The USB port 120 is an industry standard means for connecting serial devices to a host PC 100.

The host PC 100 communicates with the MFD Video Card 200 via the PCI bus 110, where a PCI slot in the host PC connects its PCI bus with a VGA controller 210 on the MFD Video Card 200. VGA controllers 210 are readily available integrated circuits designed to handle graphic data over a PC's digital bus. VGA controllers are available with a wide range of integrated features, ranging from low cost, low end, basic designs, to highly integrated ICs, with integrated 2D/3D hardware acceleration, NTSC/PAL output, integrated RAMDACs for analog RGB output, integrated TFT LCD drivers, integrated sync generators, integrated video overlay capabilities, integrated hardware scaling and video manipulation, hardware windowing, and so on. However, as the complexity of a given VGA controller increases, its cost does as well. In the preferred embodiment, reasonable compromise is made to keep costs low. Due to the relatively low resolution of the TFT LCD screens (320×240 pixels) of this preferred embodiment, and the relatively low resolution of the frame buffer (640×480 pixels), a low end PCI VGA controller is satisfactory. At these relatively low resolutions, The 33 MHz bandwidth of the PCI bus maintains acceptable video performance even without a highly integrated, high performance VGA controller. However, the features of a highly integrated VGA controller are nonetheless appreciated. As costs typically come down on these types of electrical components through time, a more capable VGA controller can be used without departing from the scope of the present invention.

The presently preferred embodiment uses a PCI VGA card to provide acceptable bandwidth to the frame buffer memory that sits on the PCI VGA card. Without acceptable available bandwidth, the data within the MFD display system's 640×480 frame buffer could not be sufficiently refreshed to give the impression of fluidity with regard to the images derived from its frame buffer. The PCI bus, at 33 MHz and 32 bits, provides 133 megabytes per second of bandwidth, which is far better than merely acceptable. In the future, however, high-bandwidth serial connections may become commonplace, which may ultimately obviate the need for the MFD Video Card 200 of the presently preferred embodiment. Although the bandwidth of normal serial and parallel ports, including USB ports (at 1.5 megabytes per second), cannot maintain enough throughput to keep a 640×480 frame buffer sufficiently refreshed, a relatively new serial communication standard known as IEEE 1394 has bandwidth capabilities as high as 50 megabytes per second. Currently, "IEEE 1394 to PCI bus" expansion cards exist which provide IEEE 1394 capability to a host computer. In a system where IEEE 1394 is present, the frame buffer memory necessary for storing image data for the present invention can exist within the main memory of the host computer, where an IEEE 1394 device driver can transmit appropriate digital video channel image data to specific MFDs, whereupon it would be received by an appropriate display driving means for the purpose of being displayed. This would eliminate the need for the MFD Video Card 200 of the present invention, and the need for implementing hardware on the MFD Video Card 200 for dividing the frame buffer memory into several predetermined subsections. IEEE 1394 could allow a device driver to transmit only that portion of the frame buffer appropriate for a given physical display set to a specific video channel, where the signal division and digital output would occur in software executing within the host computer, rather than in hardware on the MFD Video Card 200 of the present invention. An IEEE 1394 connection would also obviate the need for the USB connection of the present embodiment, because the IEEE 1394 connection could easily handle the small amount of data resulting from monitoring the state of a plurality of MFDs. However, IEEE 1394 would require proprietary protocols for using non-standard portions of the main memory of the host computer as a frame buffer for the purposes of IEEE 1394 distribution of the video channels. Although "IEEE 1394 to PCI bus" adapters are relatively expensive as of this writing, they will likely become fully integrated and ubiquitous features of most IBM compatible computer at some point in the not too distant future. When this occurs, the expense currently associated with IEEE 1394 capability will become largely irrelevant. Under such conditions, the MFD Video Card 200 may be replaced by video channel distribution that is performed by IEEE 1394 connections.

At any rate, the MFD Video Card 200 is recognized as a standard video card by the host PC 100 due to its VGA controller 210, which has an integrated VGA BIOS. New operating systems for IBM compatible computers (e.g., Microsoft's Windows 98) allow multiple video cards to operate simultaneously in the same system. As long as the VGA controller 210 is recognizable by Windows 98 as a multi-monitor compliant VGA controller, the operating system will allow multiple video cards to peacefully coexists in the same PC. The multi-screen capability of Windows 98 (or an equivalent capability in another operating system) is necessary for the MFD Video Card 200 in this preferred embodiment to be useful.

In this preferred embodiment, the MFD Video Card 200 is a SVGA (Super VGA) video card capable of 640×480 resolution at 24 bits color, which requires no more than one megabyte (1,024 k) of Video RAM 220. On a typical video card, the digital data within its Video RAM 220 is converted into an analog RGB signal 240 suitable for display on an analog monitor by RAMDAC E 230, which is a single "triple" RAMDAC (Random Access Memory Digital to Analog Converter). A single, "triple" RAMDAC is actually three independent RAMDACs integrated into a single IC, where the three single RAMDACs combine to create analog red, analog green, and analog blue video signals, to be used by an analog RGB monitor. In the preferred embodiment, RAMDAC E 230 and standard RGB output 240 are implemented to provide a second video output signal as a value added feature, such that the MFD Video Card 200 of the preferred embodiment can be a useful video card within a multi-monitor PC system, with its additional MFD features notwithstanding. In addition to the typical RGB analog output 240 provided by the single RAMDAC 230, four other RAMDACs 231,232,233,234 each convert a previously determined subset of the video RAM 220 into a corresponding analog RGB signal.

Figure 2A:
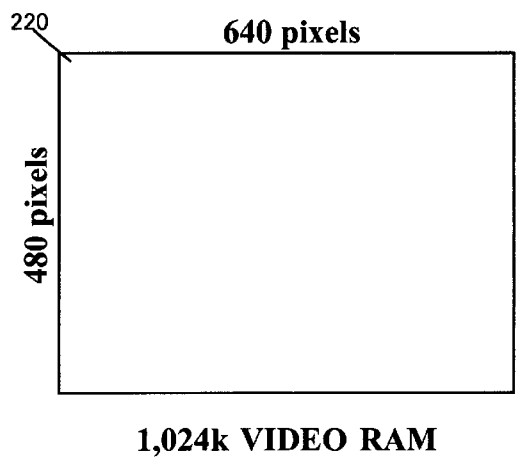
FIG. 2A is an illustration of the 640×480 frame buffer provided by the Video RAM on the present invention's video card.
Figure 2B:
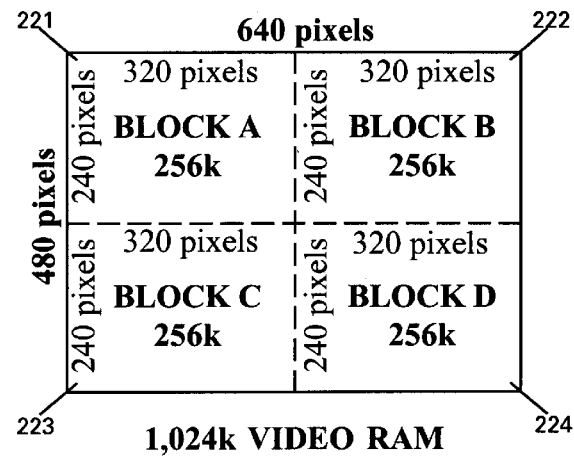
FIG. 2B is an illustration of the video RAM partitioning technique of a preferred embodiment of the present invention, wherein the frame buffer of FIG. 2A is used as four independent blocks of video RAM.

Referring now to FIG. 2A, the 1,024 k Video RAM 220 on the MFD Video Card 200 supports a 640×480 frame buffer. Dividing the 1,024 k 640×480 frame buffer of FIG. 2A into two halves vertically, then again horizontally, produces four equal 320×240 quarters as shown in FIG. 2B. In FIG. 2B, the upper left 256 k 320×240 quarter serves as Video RAM BLOCK A 221. The upper right 256 k 320×240 quarter serves as Video RAM BLOCK B 222. The lower left 256 k 320×240 quarter serves as Video RAM BLOCK C 223. The lower right 256 k 320×240 quarter serves as Video RAM BLOCK D 224. Each 320×240 block provides the image data that will be turned into an independent video signal channel. It is up to the computer simulation software executing on the host PC 100 to make appropriate use of these 320×240 frame buffer quarter sections. Essentially, it becomes the task of the supporting application to render four images in a tiled fashion within the 640×480 frame buffer area, such that each of the four Video RAM BLOCKs 221,222,223,224 contains a useful image in and of itself. Ultimately, the software application running on the host PC 100 will render four individual 320×240 images and tile them into the four 320×240 quarters existing within the frame buffer of FIG. 2A. Each 320×240 image essentially become its own video output channel, and therefore, the image so rendered into a given 320×240 panel should be a self-contained image, and not a ¼ fraction of some larger picture. Although rendering and tiling graphics in this manner is not difficult, this requires direct support by the software application that is executing on the host PC.

Referring now to FIG. 3, the division of an assumed image according to the preferred embodiment is made apparent. Assuming an image of two concentric ellipses as depicted, the 640×480 output from RAMDAC E 230 is illustrated as it would appear on an appropriate display. RAMDAC E 230 generates its output signal based upon the fall image within the 1,024 k Video RAM on the MFD Video Card 200.

The 320×240 output from RAMDAC A 231 is illustrated as it would appear on an MFD module of the preferred embodiment that is displaying CHANNEL A. RAMDAC A 231 generates its output signal based upon the image data within Video RAM BLOCK A 221.

The 320×240 output from RAMDAC B 232 is illustrated as it would appear on an MFD module of the preferred embodiment that is displaying CHANNEL B. RAMDAC B 232 generates its output signal based upon the image data within Video RAM BLOCK B 222.

The 320×240 output from RAMDAC C 233 is illustrated as it would appear on an MFD module of the preferred embodiment that is displaying CHANNEL C. RAMDAC C 233 generates its output signal based upon the image data within Video RAM BLOCK C 223.

The 320×240 output from RAMDAC D 234 is illustrated as it would appear on an MFD module of the preferred embodiment that is displaying CHANNEL D. RAMDAC D 234 generates its output signal based upon the image data within Video RAM BLOCK D 224.

Although FIG. 3 shows each of the 320×240 output images 231,232,233,234 as a fraction of the assumed 640×480 image 230, this is for illustrative purposes only. It is the burden of the software application executing on the host PC 100 to tile appropriate self-contained images in each ¼ of the frame buffer.

Now referring back to FIG. 1A, the Video RAM 220 on the MFD Video Card 200 is used as four independent blocks 221,222,223,224 by four independent RAMDACs 231,232, 233,234. RAMDAC A 231 sends its signal output into LCD DRIVER A 241, which generates LCD CHANNEL A OUTPUT 251. RAMDAC B 232 sends its signal output into LCD DRIVER B 242, which generates LCD CHANNEL B OUTPUT 252. RAMDAC C 233 sends its signal output into LCD DRIVER C 243, which generates LCD CHANNEL C OUTPUT 253. RAMDAC D 234 sends its signal output into LCD DRIVER D 244, which generates LCD CHANNEL D OUTPUT 254. These LCD Drivers 241,242,243,244 are readily available integrated circuits which convert analog RGB video signal data to a form appropriate for display on a given LCD, where the LCD Driver that is used must support the given LCD display. In the preferred embodiment, these electric components are placed on the MFD Video Card 200 in order to keep the costs of the MFD modules low.

Still referring to FIG. 1A, The LCD Drivers 241,242,243, 244 generate four independent LCD Output Channels 251, 252, 253,254 which exit the MFD Video Card 200 via a Multi-Channel Video Cable 260 which carries the four output channels within the single cable. In this embodiment, the Multi-Channel Video Cable 260 carries four channels of video, illustrated as lines 261,262,263,264, where each channel may have as many as six conductors: analog red, analog green, analog blue, horizontal and vertical sync, positive voltage, and ground. In cases where each channel is carried by six wires, a twenty-four conductor cable will be necessary for the multi-channel cable 260. In cases where composite video output is used, fewer conductors will suffice. At any rate, all four LCD Outputs 261,262,263,264 are carried by the single Multi-Channel Video Cable 260.

Figure 1B:
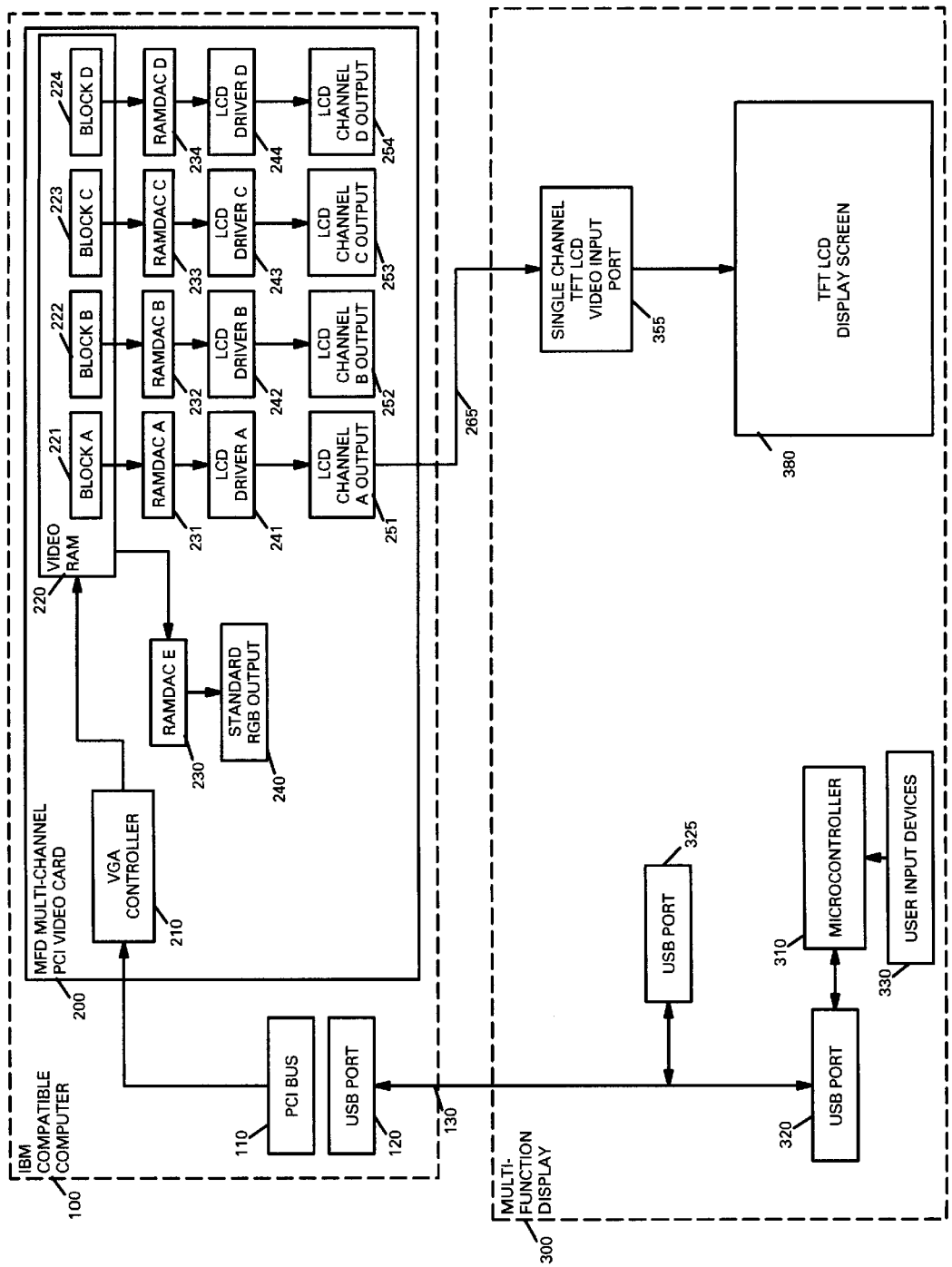
FIG. 1B is a functional block diagram illustrating a preferred embodiment of the present invention, where a single video channel is transmitted to each single MFD, thereby obviating the need for the channel selector as in FIG. 1A.

Referring now to FIG. 1B, an alternative embodiment is depicted. Each LCD Output Channel 251,252,253,254 is an independent, single channel output port, and is not some fraction of the Multi-Channel Video Output Polt 250 of FIG. 1A. In lieu of the Multi-Channel Video Cable 260 of FIG. 1A, a Single-Channel Video Cable 265 is used. Therefore, in FIG. 1B, each MFD module receives only a single channel of video by being connected directly to only one LCD Channel Output 251,252,253,254 at a time. This eliminates the need for the channel selection means 340, and will also eliminate the need for the Multi-channel TFT LCD Input Port 350, which is replaced by a Single-Channel TFT LCD Video Input Port 355. However, this requires each MFD to be physically connected to one of the four single video signal channel outputs individually available on this alternative MFD Video Card (see FIG. 5B). This alternative embodiment, while slightly more cumbersome than the preferred embodiment due to the many independent video cables that require individual connections, eliminates the costs associated with the channel selection means 340 and the Multi-Channel TFT LCD Video Input Port 350 on each MFD module. However, it is still necessary to have a channel indication means on each MFD, such that a proper channel offset value can be generated, when necessary, for the benefit of the MFD Device Driver executing within the host PC 100. This process is explained in detail further in this disclosure.

Referring back FIG. 1A, the video data carried by the multi-channel video cable 260 enters a Multi-Channel TFT LCD video input port 350 present on each MFD 300, which is connected to an electronic channel selector 340. All four channels enter the channel selector, but only the single currently selected channel is output by the channel selector 340 and displayed on the TFT LCD Screen 380. The LCD Channel Outputs 251,252,253,254 existing on the MFD Video Card 200 are analogous to the LCD Channel Inputs 351,352,353,354 existing within the MFD 300. The Multi-Channel TFT LCD Video Input Port 350 is connected in parallel to the Multi-Channel TFT Video Output Port 365, where line 360 is analogous to the multi-channel video cable 260. This pass-through 365 is provided such that each additional MFD 300 can be connected to an adjacent MFD, thereby acquiring connections to the four individual LCD output channels 251,252,253,254. The embodiment of FIG. 1A allows four such MFDs 300 to be connected to the four LCD output channels in a chain like fashion (see FIG. 5A). In the alternative embodiment of FIG. 1B, the LCD Outputs 251,252,253,254 remain independent, such that each MFD only receives a single channel of video. This eliminates the availability of modular connections to the four LCD Outputs 251,252,253,254.

Figure 4A:
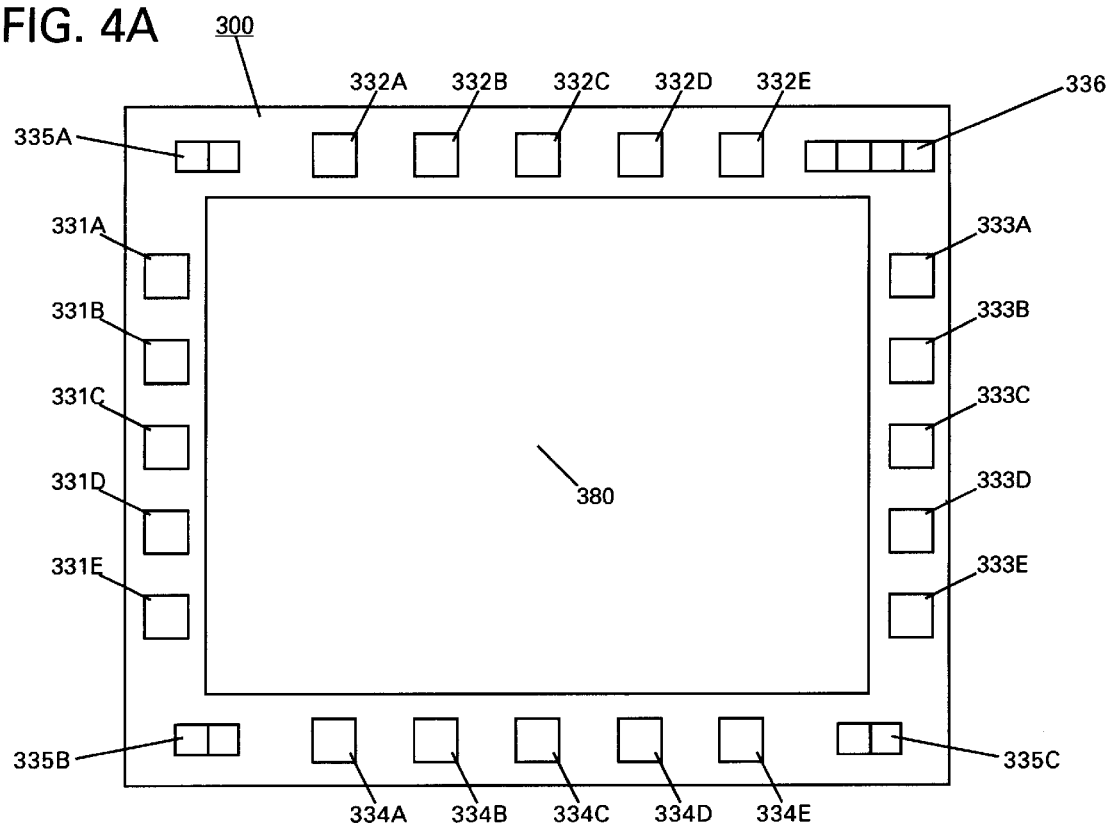
FIG. 4A is a front view of a Multi-Function Display as implemented by a preferred embodiment of the present invention.

Referring now to FIG. 4A, a single MFD module 300 is shown. The display screen 380 on the MFD 300 is a 320×240 (pixel resolution) TFT LCD, with an approximate diagonal measurement of five inches. Although any size display may be used, a five inch diagonal measure TFT LCD is a good compromise between size, functionality, and expense. Other types of LCD may also be used, such as STN color modules and grayscale LCDs, but TFT LCDs offer a high quality picture with regard to brightness, color, image clarity, and large viewing angle. As TFT LCDs become more common, and their cost comes down, there is no limitation on the resolution of the LCD used for the MFD display screen 380. If a given MFD display screen 380 had a physical resolution of 640×480, and four screens were to be supported by a single MFD Video Card 200, the MFD Video Card 200 would need enough Video RAM 220, and a capable VGA Controller 210, to support a larger 1280×1024 frame buffer. Any number of configurations is conceivable.

Figure 2C:
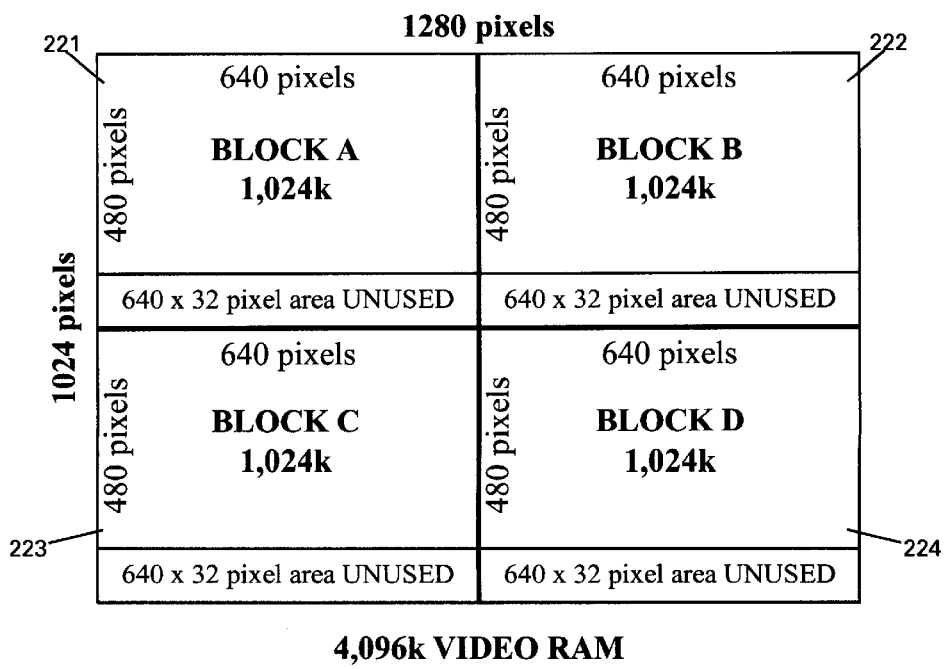
FIG. 2C is an illustration of a 1280×1024 frame buffer partitioned into four video channels, each having a useful resolution of 640 by 480 pixels.

Referring now to FIG. 2C, a frame buffer with a standard resolution of 1280×1024 supports four video channels of 640×480 useful resolution. Dividing a 1280×1024 frame buffer into four equivalent sections actually yields four 640×512 resolution video channels, rather than the 640×480 useful resolution cited above. However, 640×512 is a non-standard screen resolution, and therefore, 32 pixels of each 512 pixel vertical resolution quarter would be ignored by the video division hardware within the MFD Video Card 200, thereby yielding four 640×480 sections, with four 640×32 pixel blocks not represented within the four video channels derived from the 1280×1024 frame buffer. These four 640×32 pixels blocks are depicted in FIG. 2C. These 640×32 blocks of memory, while not contributing directly to any on-screen image, can be used to store data that is used in some other fashion. It is conceivable that this memory can be used to store textual data, or can be used to store graphical data for use by a hardware video overlay function. However, the presently preferred embodiment makes no direct use of this unused memory, and discards it in favor of keeping the video channel frame buffer blocks at standard screen sizes for ease of use. Likewise, in a case where a 1280×1024 frame buffer was divided into sixteen equivalent sections, sixteen 320×256 video channels would result, rather than channels of 320×240 resolution as cited above. However, 320×256 is a non-standard screen resolution, and therefore, 16 pixels of each 256 pixel quarter would be ignored by the video division hardware within the MFD Video Card 200, thereby yielding sixteen 320×240 useful sections, with sixteen 320×16 pixel blocks not represented within the sixteen video channels derived from the 1280×1024 frame buffer. It is likely that only a subset of the sixteen available channels would be used at one time, because sixteen channels is quite cumbersome to manage, in terms of computational overhead and the physical accommodation of that many MFDs at a single station. Nevertheless, sixteen channels 320×240 channels would derive from a single 1280×1024 frame buffer.

In any case, it remains the task of the software application executing on the host PC 100 to render and tile the supported video channels in such a way as to correspond with the partitioning technique of any given implementation. However, as the resolution of each MFD's display screen increases, it becomes more computationally expensive to render the graphics for that particular display screen. In order to keep computational overhead to a minimum, the presently preferred embodiment uses four channels of 320×240 video, as provided by the MFD Video Card 200. An alternative to the preferred embodiment would be to use NTSC or PAL conversion of each video channel, such that the resolution of the image contained within a given video channel is independent of the physical resolution of an NTSC or PAL compatible display screen on which it is to be displayed. However, NTSC and/or PAL conversion creates harmful artifacts, color crawl, and flickering within the converted image. For this reason, NTSC and/or PAIL conversion is not utilized in the preferred embodiment, but such image format conversions should not be consider a departure from this disclosure.

Still referring to FIG. 4A, the MFD display screen 380 is surrounded by user input devices (330 of FIG. 1A). These user input devices are arranged in four groups of five buttons 331–334, with a fifth group of three switches 335, and a channel selector switch 336. These user input devices are connected to a microcontroller (310 of FIG. 1) in a multiplexed fashion in order to make efficient use of I/O lines on the microcontroller 310. The microcontroller is a readily available integrated circuit with EEPROM memory for storing its own specific programming. The user input devices, as illustrated in FIG. 4, are electrically connected to the microcontroller 310 as a 5×6 matrix using eleven I/O lines, total.

User input devices in groups 331,332,333,334 are normally open, momentary, SPST switches. In the preferred embodiment, they are tactile collapsing dome switches that have a very short travel and a positive click when they are actuated via their 7 mm square plastic caps. Other types of switches, such as membrane switches, can be used as well. There are five switches on each side of the display screen 380. Switches 331A, 331B, 331C, 331D, 331E are situated to the left of the display screen. Switches 332A, 332B, 332C,332D, 332E are situated above the display screen. Switches 333A, 333B, 333C, 333D, 333E are situated to the right of the display screen. Switches 334A, 334B, 334C, 334D, 334E are situated below the display screen. User input devices 335A, 335B, 335C are two position toggle switches, situated at the corners of the display screen 380. User input device 336 is a four position slide switch. In the embodiments of FIG. 1A and FIG. 1B, the four position slide switch 336 communicates its position to the microcontroller 310, such that the microcontroller can generate an appropriate channel offset value (explained in detail later in this disclosure). In FIG. 1A, the microcontroller 310 also controls a digital electronic channel switching means 340, as indicated by the four position slide switch 336. Cost may be kept down, however, by using a physical switching means, where the user input device for channel switching 336 performs the actual physical switching of the video signal, while simultaneously reporting its active channel to the microcontroller 310.

Referring back to FIG. 1A, the microcontroller reads the user input devices and transmits digital information back to the host PC 100 via the USB ports 320,120. No more than single byte of information is necessary to transmit the complete state of all the switches on the MFD as shown in FIG. 4A. The digital data transmitted back to the host PC 100 is a single number corresponding to the most recently pressed user input device on the MFD 300, where that single number is derived from a predetermined numerical value corresponding to that switch, plus an predetermined offset value corresponding to the currently selected video channel (indicated by the four position slide switch 336). In the presently preferred embodiment, there are a total of twenty push-button switches 331A–334E, three toggle switches 335A–335C, and a four position slide switch 336. However, many other numbers and configurations of user input devices are possible. An alternative approach for these user input devices is to replace them all with a "touch screen" surface on the display screen 380 of the MFD 300. In the case of a touch screen used to replace the MFD user input devices 330, it is likely that the image displayed on the MFD's display screen would depict "virtual" user input devices that would be functionally identical to the actual user input devices, were they to exist. In the case of a touch screen enabled MFD, its display screen would have to be slightly larger to accommodate the images of the virtual user input devices around the periphery of the display screen, so as not to diminishing the effective display area with respect to an MFD with the physical user input devices shown in FIG. 4A. However, a touch screen would provide more user input device surface area, and would be more flexible in its configuration, due to the fact that virtual user input devices are composed of completely changeable images, rather than physical electric components. Furthermore, the entire image area could be interacted with, assuming, for example, a coordinate system that told the host computer what area of the image was touched. Although a touch screen is appreciated, its use is nonetheless avoided due to cost and complexity factors. However, a touch screen could be integrated with the multi-function displays of the present invention without exceeding the scope of this disclosure.

In order to eliminate confusion regarding the reprogrammable functions assigned to the many user input devices of the present invention, an on-screen labeling system can be used wherein the image to be displayed on each video channel contains textual labels within the image itself, such that when the image is displayed on a given MFD tuned to a specific channel, the textual labels within the image fall adjacent to the user input device they intend to illustrate the functionality thereof. This requires support by a compatible software application. Although a video overlay image containing on-screen user input device labels could be programmed into a graphic overlay system implemented within a given MFD, such that the screen overlay image can be activated and deactivated upon the actuation of a specific user input device for the purpose of illustrating the pre-programmed functionality of all the user input devices on the given MFD, the preferred embodiment has left the implementation of on-screen user input device functionality labels to the compatible software application executing on the host computer. While the benefits of such an integrated, reprogrammable, on-screen graphic overlay system are appreciated, it has not been implemented in the preferred embodiment due to the unavoidable complexity and cost associated with such a system.

An alternative approach for identifying the functionality of the user input devices is to provide a means whereby specifically sized templates can be printed, cut out, and affixed to each MFD, such that textual labels that describe the functionality of the user input devices fall adjacent to their corresponding user input devices. A means to accommodate these printed labels can be integrated into the plastic housing of the MFD modules of the present invention, such that the printed labels can fit within a template specifically meant to hold them. Furthermore, functionality can be added to a provided software application that executes on the host computer, such that the textual labels can be printed by most standard printers in the exact size necessary to fit the provided template. However, these features have not been implemented on the preferred embodiment, in favor of the on-screen labels described above.

On many actual MFDs in military vehicles, the capability exists of "inverting" the brightness of a graphical image, such that the contrast of the displayed image can be increased in order to bring about better readability of the displayed image. Features such as these are best achieved through implementation by the software application executing on the host computer, and not by the preferred embodiment of the MFD of the present invention. Due to the presupposition that the software application executing within the host computer has supported the rendering of images that fit precisely into the predetermined frame buffer subsections required by the frame buffer division hardware within the MFD Video Card 200, it becomes desirable to allow the software application, and not the hardware of the present invention, to interpret the activation of a given user input device as a request to modify a given rendered image in some useful way, where the software application then renders the given image to reflect the requested modification. However, implementing image modification capability within the hardware of the present invention, such that actuating a given user input device causes the modification of the corresponding displayed image, should not be construed as a departure from this disclosure.

Referring now to FIG. 8A, the functionality of the microcontroller 310 ROM is illustrated. In block 400, the microcontroller 310 reads the state of the user input devices on its MFD 300. Block 410 applies in the case of the embodiment of FIG. 1A where there is a digitally controlled channel selection means. Where applicable, the microcontroller 310 controls the channel selector 340 such that it selects the channel indicated by the four position user input device 336. In block 420, the microcontroller generates an output value indicative of the most recently pressed user input device, including a channel offset value. Notwithstanding the four position slide switch 336, the twenty switches 331A–334E generate numerical values 1 through 20, and the three toggle switches 335A–335C generate numerical values 21–23 upon being toggled. The ordering of the numbers are arbitrary, and can be in any order whatsoever, as long as each switch is assigned a unique numerical code that remains consistent. The microcontroller 310 takes the number indicative of the most recently pressed user input device (a number from 1–23), and adds a channel offset to it. If no switch is pressed, 0 is the final numerical code, and no offset is added. If the four position slide switch 336 is set for CHANNEL A, the value 0 is added to the most recently generated non-zero numerical code. If the four position slide switch 336 is set for CHANNEL B, the value 23 is added to the most recently generated non-zero numerical code. If the four position slide switch 336 is set for CHANNEL C, the value 46 is added to the most recently generated non-zero numerical code. If the four position slide switch 336 is set for CHANNEL D, the value 69 is added to the most recently generated non-zero numerical code. This essentially produces a number which indicates the switch that was actuated by the user, and the video channel to which the given MFD was set when that switch was pressed. CHANNEL A yields numerical values between 1–23. CHANNEL B yields numerical values between 24–46. CHANNEL C yields numerical values between 47–69. CHANNEL D yields numerical values between 70–92. This makes it very easy to decode (from the offset result) which channel the MFD was in when the most recent user input device was actuated.

Still referring to FIG. 8A, block 430 transmits this single byte of information to the host PC 100 via the USB cable 130. USB functionality is implemented in the present invention by readily available integrated circuits that are designed to handle the USB data stream. Microcontrollers are available where USB functionality is integrated into the microcontroller's on-chip peripherals. Device drivers that communicate with USB devices are well known to those skilled in the art, and will not be discussed in detail herein. Furthermore, Windows 98, the operating system of choice for the presently preferred embodiment of the present invention, has USB functionality built into the operating system, such that device drivers are easily implemented.

Referring now to FIG. 8B, an MFD device driver 390 is executing within the host PC 100. In block 440, the MFD device driver 390 receives the numerical data from the MFD 300. In block 450, the MFD device driver 390 then looks up a corresponding entry in a lookup table, where that corresponding entry contains codes to be handed off to the host PC. In block 460, these codes are implemented on the host PC 100 as equivalent keyboard presses on the keyboard of the host PC, by stuffing the codes into the keyboard buffer of the host PC. However, the present invention should not be considered to be limited with regard to the functionality of the contents of its user input device resultant code lookup table. The MFD device driver 390 that carries out courses of events represented by the contents of its lookup table can be made to emulate any given predetermined manipulation of some specific component of the host computer system, provided the method of operation of the device to be emulated is well understood in advance. Understanding how a given component of the host computer operates may allow it to be emulated in software, thereby expanding the capabilities of the user input devices on the MFDs of the present invention via the MFD device driver 390.

Due to the requirements of the present invention for direct support by the software application executing on the host PC with regard to the tiling of the various video channels, it is not presumptuous to suspect a given software application will also be able to handle the native numerical values handed to the MFD device driver by the microcontroller 310. However, in cases where direct support for the native user input device codes is not implemented by the software application executing on the host PC 100, the MFD device driver hands the previously determined equivalent keyboard keypresses to the host PC via its keyboard buffer, where the software application executing on the host PC is unaware that the keypress occurred on the MFD, and rather handles them just as if the user had pressed the equivalent keys on the host PC's own keyboard.

By keeping the codes in the MFD constant, and allowing the MFD device driver to use its own lookup table, the design of the preferred embodiment is greatly simplified. An MFD device driver configuration application can easily allow modification of the MFD device driver's lookup table, such that any combination of desired keyboard keycodes can be emulated on the host PC. By using the host computer's RAM, there will be far less limitation on the number of keyboard sequences that can be attached to the actuation of a given user input device on the MFD. It is possible to deliver very large "macros", or keyboard sequences, by using the reconfigurable device driver lookup table of the present invention. The reconfiguration of the MFD 300 would occur by prompting the user to indicate the user input device they wish to configure, either by pressing the desired physical button or by clicking on the same button on a graphical representation of the MFD, and then recording the desired keyboard command sequence. After a set of keyboard sequences is recorded, the file can be saved for later implementation.

In this way, there is no need for RAM or non-volatile RAM within the MFD 300, which would have to be reprogrammed before the MFD would function as desired with regard to its user input devices 330. Of course it is feasible to introduce non-volatile RAM into the MFD, and to have it reprogrammable through an external software application, where, for example, keyboard keycodes could be stored internally within the MFD, where pressing a given user input device requires the microcontroller 310 to use its own internal lookup table, whereby the microcontroller would transmit the previously stored keyboard keycodes to the host PC 100. However, this complexity is unnecessary, and is not used in the presently preferred embodiment.

Figure 4B:
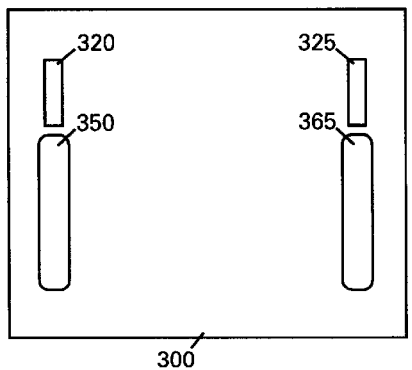
FIG. 4B is a rear view of the Multi-Function Display of FIG. 4A, with the multi-channel video input and output ports of FIG. 1A.

In order to provide for the modularity of the MFDs, pass-through connectors are provided on the back of the MFDs. Referring now to FIG. 4B, the right side of the back of the MFD provides a USB port 320 and a Multi-Channel Video Input Port 350. The USB port 320 connects to a USB port 120 on the host PC 100. The Multi-Channel Video Input Port 350 connects to the Multi-Channel Video Output Port 250 on the MFD Video Card 200. The left side of the back of the MFD provides a USB port 325 and a Multi-Channel Video Output Port 365 which is analogous to the Multi-Channel Video Output Port 250 on the MFD Video Card 200. Together, ports 325 and 365 on the back of the MFD provide pass-through ports such that additional MFDs can plug into an MFD that has already been connected to the host PC.

Figure 5A:
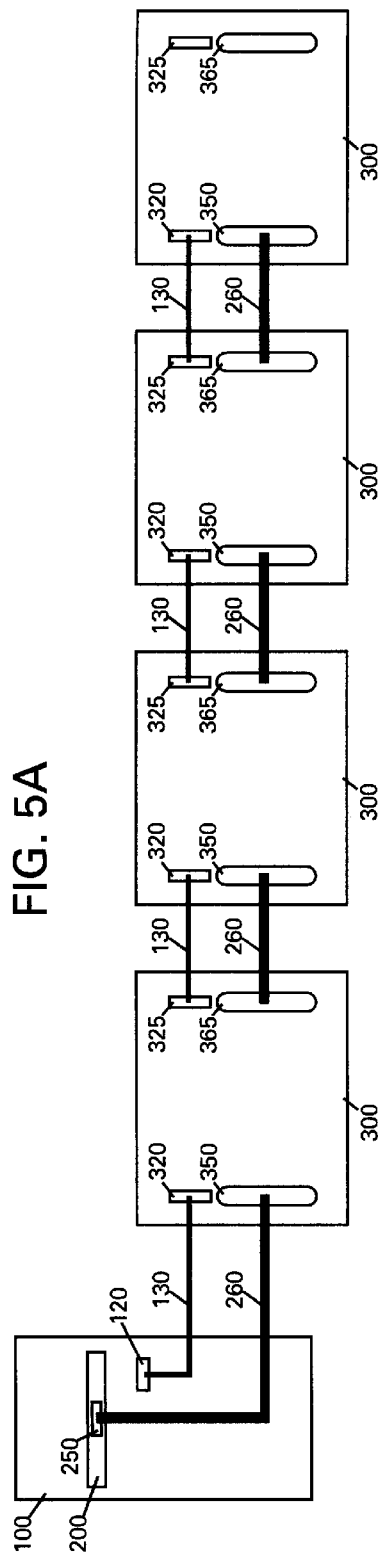
FIG. 5A is an illustration of four Multi-Function Displays of FIG. 4B, connected in modular fashion.

Referring now to FIG. 5A, four MFDs 300 of the configuration of FIG. 4B and the embodiment of FIG. 1A are shown connected in modular fashion via the pass-through ports on the back of the MFDs. Each MFD is identical, and hence, a module of a multiple MFD system.

Figure 4C:
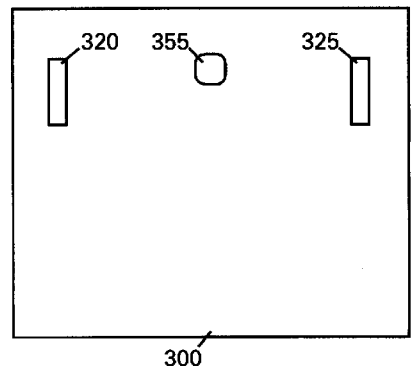
FIG. 4C is a rear view of the Multi-Function Display of FIG. 4A, with the single channel video input of FIG. 1B.
Figure 5B:
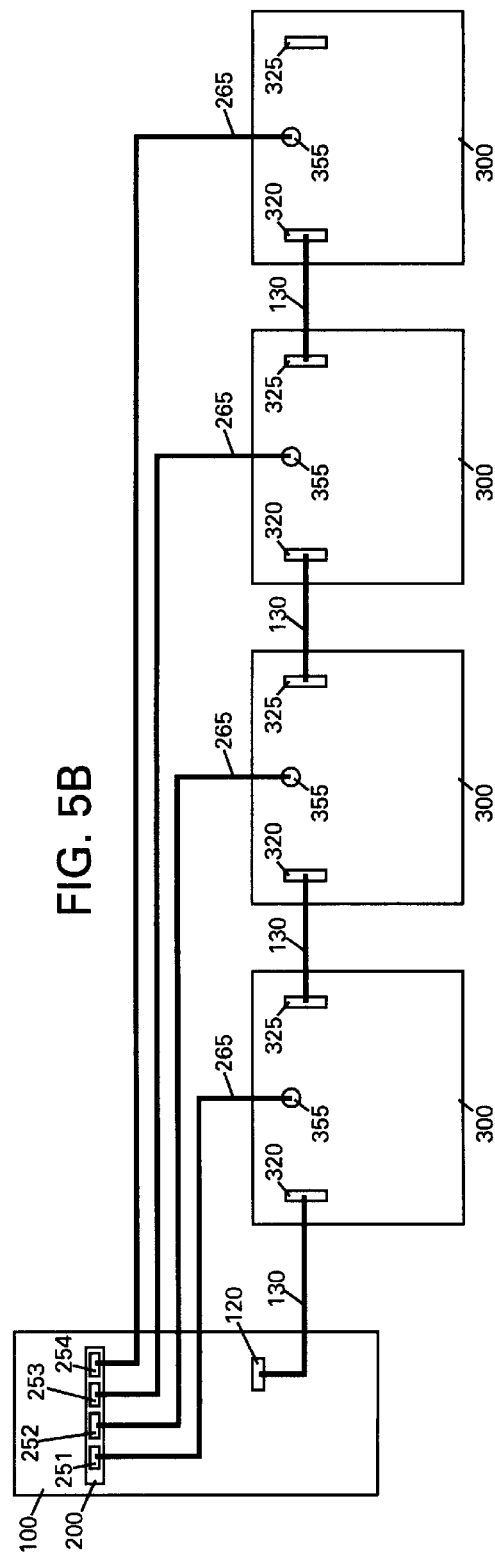
FIG. 5B is an illustration of four Multi-Function Displays of FIG. 4C, connected in modular fashion.

Referring now to FIG. 4C, ports 350 and 365 of FIG. 4B have been eliminated and replaced with a Single-Channel Video Input Port 355, as dictated by the embodiment of FIG. 1B. FIG. 5B depicts four MFDs 300 of the configuration of FIG. 4C and the embodiment of FIG. 1B when connected in modular fashion. Each MFD is identical, and hence, a module of a multiple MFD system.

In the cases of FIGS. 5A and 5B, the illustrated embodiments provide that four individual MFD modules can be driven by a single MFD Video Card 200. However, one can readily design an embodiment where many more MFD modules can be driven from a single MFD Video Card without departing from the teachings of the present invention.

Figure 6A:
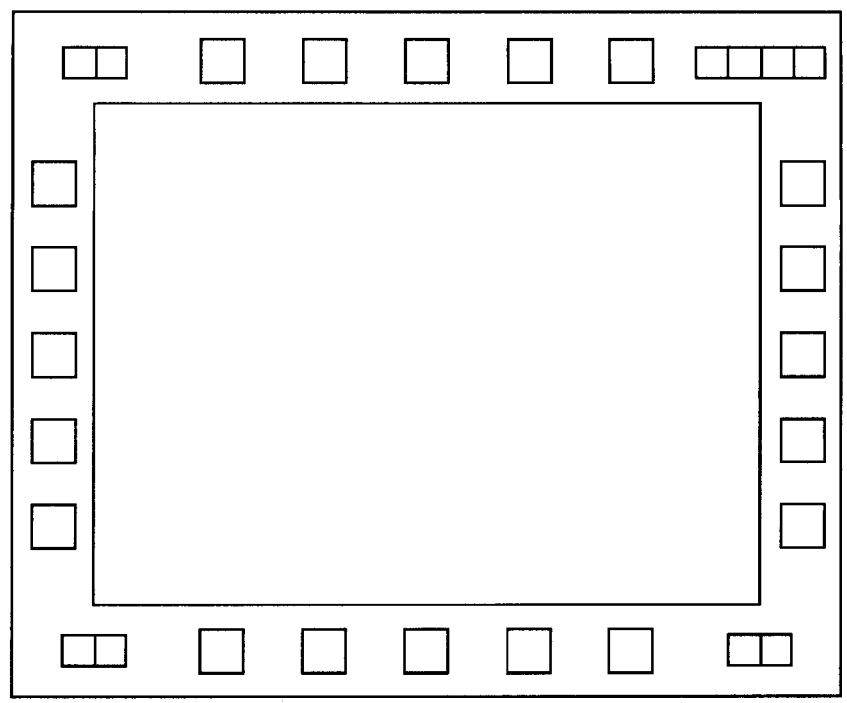
FIG. 6A is a front view of the Multi-Function Display of FIG. 4A when oriented in a landscape fashion.
Figure 6B:
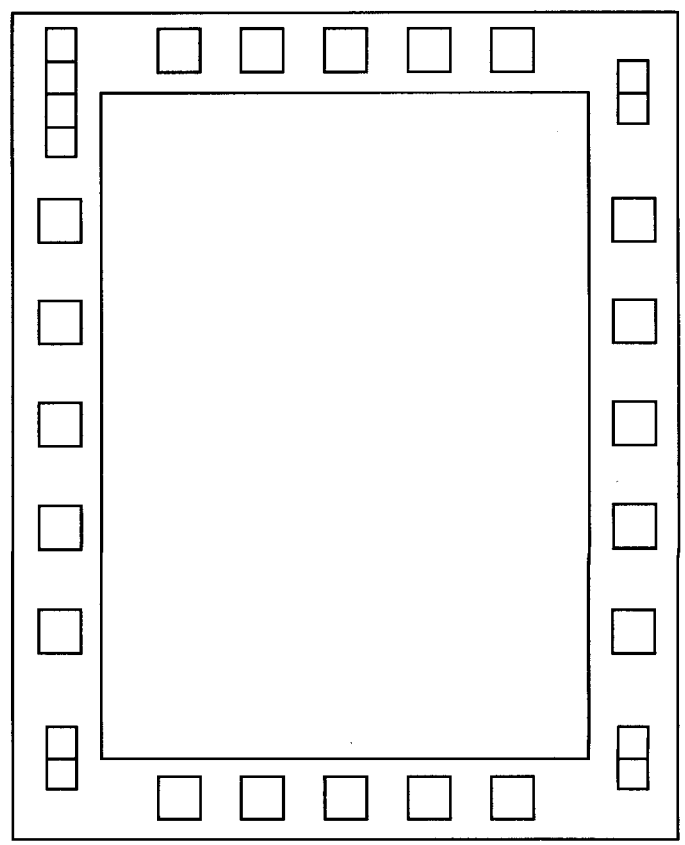
FIG. 6B is a front view of the Multi-Function Display of FIG. 4A when oriented in a portrait fashion.

It is rare for TFT LCDs to be perfectly square, and therefore, any given TFT LCD screen can be situated in a landscape or portrait orientation. FIG. 6A shows the MFD 300 of FIG. 4A oriented in a landscape fashion. FIG. 6B shows the MFD 300 of FIG. 4A oriented in a portrait fashion. Depending on the requirements of the image that is to be displayed on any given MFD, one orientation may provide more efficient use of display area than the other.

Furthermore, when oriented in portrait fashion, four MFDs will take up less horizontal space than four identical MFDs in landscape fashion. To make best use of the shape of these TFT LCD screens, there is a mercury switch (or an equivalent) in each MFD that tells the microcontroller 310 what orientation the screen is in. This information is then transmitted to the host PC 100 via the USB 120,320, where the MFD device driver can let the software application know how to orient its image on that particular video channel. To accommodate easily pivoting the MFD modules to either orientation, a very simple integrated stand can be implemented on each MFD allows each MFD to be rotated and held into position as desired. This stand has not been illustrated on the accompanying drawings.

Figure 7A:
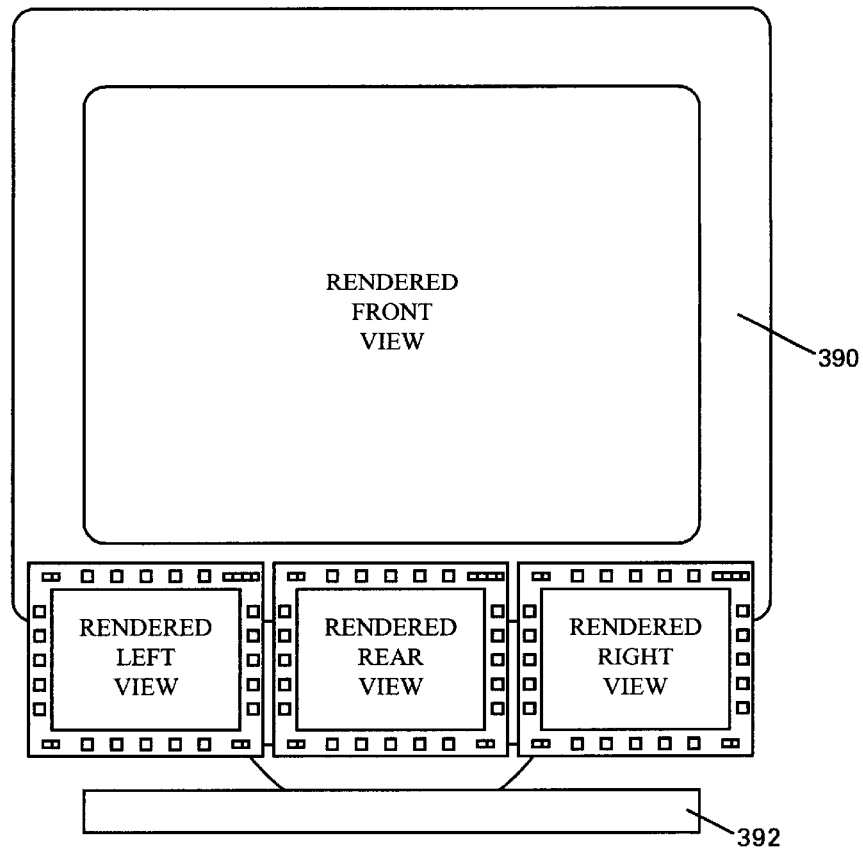
FIG. 7A is an illustration of three Multi-Function Displays of FIG. 6A, arranged as a group of three displays adjacent to a primary display, wherein the three MFDs each show one of a left, rear, and right rendered view, and the primary display shows a front rendered view, thereby affording a near 360 degree view of a rendered world.
Figure 7B:
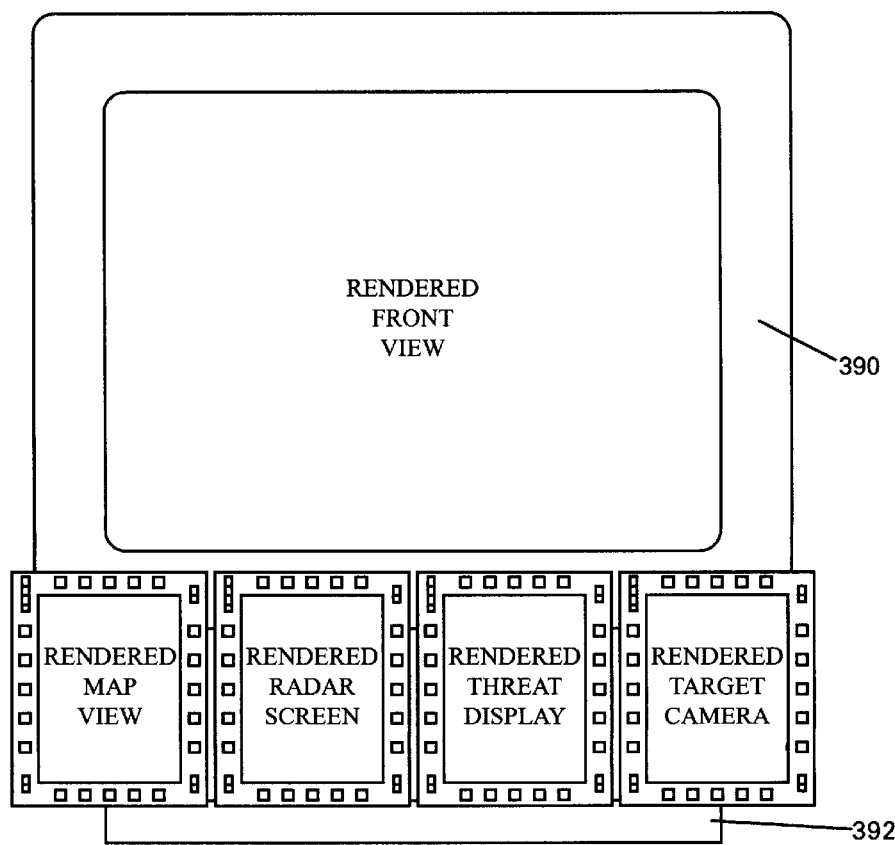
FIG. 7B is an illustration of four Multi-Function Displays of FIG. 6B, arranged as a group of four displays adjacent to a primary display, wherein the four MFDs each show various instrumentation.

One of the greatest frustrations when interacting with a computer simulation via a typical monitor is that the field of view is limited by physical display area of a primary display. A means by which the present invention overcomes this limitation is depicted in FIG. 7A and FIG. 7B. In FIG. 7A and FIG. 7B, the apparent size ratio of the MFDs to the primary display 390 assumes that the MFD display screens have approximately a five inch diagonal screen measurement, and that the primary display is a conventional CRT monitor, with a viewing area of approximately sixteen inches diagonal measurement. Assuming a seventeen inch monitor (with a sixteen inch viewing area) as the primary display 390, with an adjustable monitor stand 392, and MFDs with a five inch diagonal screen measurement each, three landscape oriented MFDs can fit within the horizontal outer dimension of the primary display.

Referring now to FIG. 7A, three Multi-Function Displays in a landscape orientation are arranged as a group of three displays adjacent to the primary display 390, wherein the three MFDs each show one of a left, rear, and right rendered view, and the primary display 390 shows a front rendered view, thereby together affording a near 360 degree view of a rendered world. The user input devices on the MFDs can, of course, cause the screen image to change to a different desired view, and generally display any desired images, but this arrangement is excellent for giving a near 360 degree view of the rendered world at a glance. In a driving simulation, for example, there is not much need for cockpit instrumentation that can not be rendered on the primary display (e.g., engine RPM, vehicle MPH, fuel remaining, lap time, etc.). However, by implementing the apparatus and method of FIG. 7A, a driving simulation user can see cars to the left, cars to the right, and cars coming up from the rear, which would not normally be visible within the constraints of the primary display 390.

Referring now to FIG. 7B, four Multi-Function Displays in a portrait orientation are arranged as a group of four displays adjacent to a primary display 390, wherein the four MFDs each show various instrumentation. Assuming a seventeen inch monitor (with a sixteen inch viewing area) as the primary display 390, with an adjustable monitor stand 392, and MFDs with a five inch diagonal screen measurement each, four portrait oriented MFDs can approximately fit within the horizontal outer dimension of the primary display 390. The four portrait oriented MFDs of FIG. 7B are utilized as a group of military aircraft instrumentation devices, where the leftmost MFD shows a rendered map view, the next to leftmost MFD shows a rendered radar screen, the next to rightmost display shows a rendered threat display, and the rightmost display shows a rendered target camera view. The user input devices on each display are configured to aid in the manipulation of the data and image on each corresponding display, thereby making it much easier to use the complex systems represented in the computer simulation. In a more elaborate implementation, the apparatus of both FIGS. 7A and 7B can be combined to yield 7 simultaneous displays arranged around the periphery of the primary screen 390, where the MFDs of FIG. 7B would remain in the same location, while the MFDs of FIG. 7A would be attached to the edges of the primary display in a location relative to the view each is set to display. This would provide the aforementioned near 360 degree view of the rendered world, simultaneous with the cockpit data generally available in real modern military aircraft.

The images displayed on each MFD are entirely determined by a compatible software application executing on the host computer 100, and therefore, any desired image can be made to appear on any given display. For example, during an internet gaming session where a player challenges other human players in a virtual world, an opponent's viewscreen can be shown on a local MFD, allowing a player to see first hand what their opponent sees during the session. In addition to displaying the world views and instrumentation of computer simulations, any manner of useful data can be displayed as well. For example, video conferencing data streams could appear on one or more MFDs, thereby not obscuring the sharing of data occurring on a primary screen, while internet bandwidth and data transfers can be monitored as well. Ultimately, these MFDs can be used as small windows apart from the primary display means, where it is entirely up to a compatible software application to provide whatever images it has been designed to render.

Although a preferred embodiment which incorporates the teachings of the present invention has been shown and described in detail herein, those skilled in the art can readily devise many other varied embodiments that still incorporate these teachings. Therefore, it is to be understood that nothing shall be construed as a limitation of the present invention, other than the structure recited in the appended claims.

I claim:

1. A multi-function display system comprising:
    a host computer having its own primary video display system or systems;
    a secondary video display system within the host computer, with frame buffer memory that is independent of the primary video display system or systems;
    a means for dividing the frame buffer memory of the secondary video display system into predetermined subsections, where each subsection serves as a specific video channel's frame buffer;
    a means for executing a compatible software application on the host computer for rendering independent, self-contained images within each video channel's frame buffer;
    a means for converting the digital data within each video channel's frame buffer into an independent video channel output signal, thereby generating a plurality of independent video channel output signals;
    a plurality of multi-function displays;
    and a means within the host computer for interpreting a transmitted code from the plurality of the multi-function displays and then carrying out a course of events on the host computer that had been preassigned to the transmitted code;
    wherein each of said plurality of the multi-function displays comprises a means for transmitting the plurality of the independent video channel output signals to one or more multi-function displays for the purpose of being displayed;

a plurality of user input devices attached to the display;

a means for examining a state of the user input devices on each display;

a means for generating an output code indicative of both the examined state of the user input devices on a selected display, and a selected video channel to which the selected display was set by the user input devices when the state of the user input devices was examined;

a means for transmitting said output code to said host computer;

and a channel selection means for selecting one of the plurality of the independent video channel output signals to be displayed on the display in response to a user input via the user input devices.

2. The multi-function display system according to claim 1 wherein the frame buffer of the secondary video display system is divided into 4 subsections, thereby providing 4 video output channels.

3. The method of claim 2 wherein the frame buffer of the secondary video display system has a resolution of 640 by 480 pixels which provides 4 video channels with 320 by 240 pixels of useful resolution each, or has a resolution of 1280 by 1024 pixels which provides 4 video channels of 640 by 480 pixels of useful resolution each.

4. The multi-function display system according to claim 1 wherein the frame buffer of the secondary video display system is divided into 16 subsections, thereby providing 16 video output channels, where all or a subset of the 16 available video channels may be utilized.

5. The method of claim 4 wherein the frame buffer of the secondary video display system has a resolution of 1280 by 1024 pixels which provides 16 video channels of 320 by 240 pixels of useful resolution each.

6. The multi-function display system according to claim 1 wherein each multi-function display can be oriented in a landscape or portrait fashion, and can transmit a state of its orientation to the host computer, such that the orientation of the image to be displayed on its screen can be made to match the orientation of the physical display.

7. The multi-function display system according to claim 1, wherein the course of events to be carried out on the host computer occurs via a device driver, which transmits a predetermined keyboard sequence into a keyboard buffer of the host computer.

8. The method of claim 7, wherein the predetermined keyboard sequences that are to be transmitted into the keyboard buffer of the host computer are determined by using a software application that allows said user input device and corresponding video channel to be designated, where the software application then records the desired keyboard sequence that is to be repeated upon subsequent activation of the designated user input device when its multi-function display is in the prescribed video channel.

9. The multi-function display system according to claim 1, further comprising:

at least one video channel which contains a rear view perspective of a simulated world generated by a software application executing on a host computer;

at least one video channel which contains a left view perspective of a simulated world generated by a software application executing on a host computer;

and at least one video channel which contains a right view perspective of a simulated world generated by a software application executing on a host computer.

10. The method of claim 9, further comprising three multi-function displays arranged such that:

a display showing a rear view channel is situated below or above a centerline of a primary display screen;

a display showing a left view channel is situated to the left of a centerline of the primary display screen;

and a display showing a right view channel is situated to the right of a centerline of the primary display screen.

11. The multi-function display system according to claim 1, wherein each multi-function display is substantially identical to additional multi-function displays that it can share connections with, such that each multi-function display is a single component of a modular system.

12. The multi-function display system according to claim 1, wherein the plurality of user input devices attached to each display comprises:

a row of horizontally aligned push-button switches above the display screen;

a row of horizontally aligned push-button switches below the display screen;

a row of vertically aligned push-button switches to the left of the display screen;

and a row of vertically aligned push-button switches to the right of the display screen.

13. The multi-function display system according to claim 1, wherein the course of events to be carried out on the host computer occurs via a device driver, which emulates some predetermined manipulation of some specific component of the host computer system.

14. A multi-function display system according to claim 1, wherein transmitting codes representing the states of the user input devices of one or more multi-function displays to a host computer occurs via the Universal Serial Bus (USB).

15. The multi-function display system according to claim 1 wherein the host computer is IBM compatible.

16. The multi-function display system according to claim 1 wherein the secondary video display system within the host computer is provided by a video card which utilizes standard screen sizes.

17. A multi-function display system according to claim 1 wherein the compatible software application executing on the host computer is a flight simulation.

18. A multi-function display system according to claim 1 wherein the compatible software application executing on the host computer is a driving simulation.

* * * * *